Aug. 10, 1926.
M. H. BREDE
1,595,820
FILLER CAP FOR GASOLINE TANKS AND THE LIKE
Filed May 14, 1924
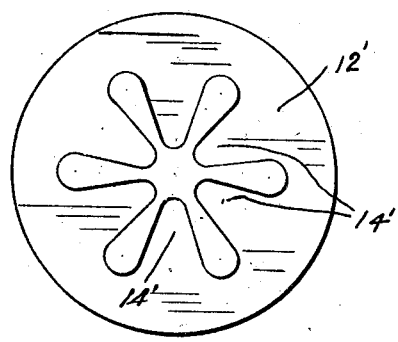
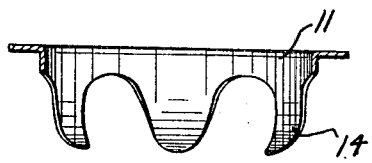
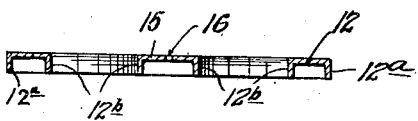
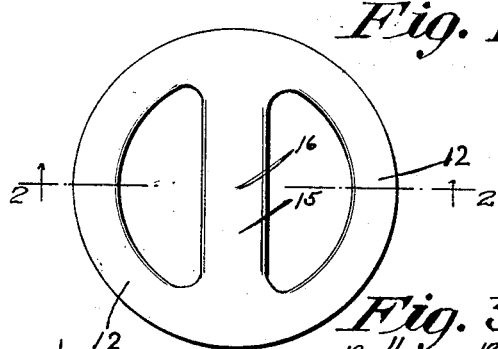
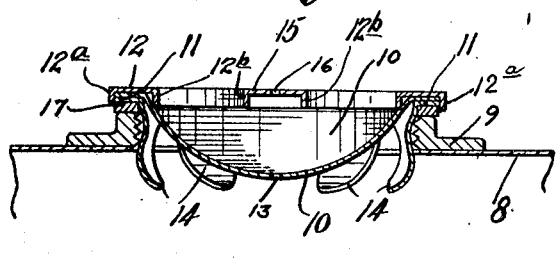
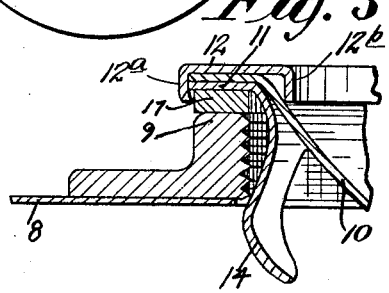
Inventor
Martin H. Brede
By his Attorneys
Merchant and Kilgore Patented Aug. 10, 1926.

1,595,820

UNITED STATES PATENT OFFICE.

MARTIN H. BREDE, OF MINNEAPOLIS, MINNESOTA.

FILLER CAP FOR GASOLINE TANKS AND THE LIKE.

Application filed May 14, 1924. Serial No. 713,365.

My invention relates to closure caps capable of various different uses and applications, but particularly designed and especially adapted for use as a filler cap for the gasoline tanks of automobiles. Generally stated, the invention consists of the novel construction and arrangements of parts hereinafter described and defined in the claims.

The particular cap illustrated is especially designed for use as a filler cap for the gasoline tanks of Ford automobiles or other automobiles, the tanks of which are under the seat or otherwise located so that they are not exposed to rain.

This improved cap is designed to be cheaply stamped from sheet metal and to be easily assembled and, when assembled, affording a very neat or rather ornamental and highly efficient filler cap adapted to be quickly applied and quickly removed. The cap as thus designed comprises three metallic elements, towit: a flanged bowl, a pronged spring-retaining ring, and a clamping rim.

In the accompanying drawings, which illustrate the invention, like characters indicate like parts throughout the several views.

Referring to the drawings:

Fig. 1 is a plan view of the filler cap, showing the same removed from working position;

Fig. 2 is a transverse vertical section on the line 2—2 of Fig. 1, but showing also in section a portion of the gasoline tank;

Fig. 3 is a fragmentary section on the same line as Fig. 2, but showing the parts on a larger scale than in said latter noted view;

Fig. 4 is a plan view showing the flat blank from which the pronged retaining ring is formed;

Fig. 5 shows the retaining ring in diametrical section on the same line as Fig. 2;

Fig. 6 shows the bowl in diametrical section on the same line as in Fig. 2; and

Fig. 7 shows the clamping rim on the same section line as in Fig. 2.

The gasoline tank 8, which may be assumed to be that of a Ford automobile, is provided with the customary internally threaded flanged filler neck 9, into which, in the old arrangement, a filler cap is screw-threaded.

Of the parts of the improved filler cap, the numeral 10 indicates the flanged bowl, the numeral 11 the flanged retaining ring, and the numeral 12 the clamping rim. The bowl 10, at its axis and lower portion, has a very small air passage 13. The retaining ring 11 has an outstanding flange and depending circumferentially spaced spring prongs 14. The rim flange of the retaining ring 11 is seated against the under side of the rim flange of the bowl 10, the said two rim flanges being of approximately the same diameter. The clamping rim 12 has a diametrical bar 15 and serves as a handle or finger piece and, preferably, is formed with a perforation 16 through which a needle or small wire may be passed to open up the air passage 13 of the bowl in case the latter should become clogged. At its exterior, the clamping rim 12 has a downturned flange 12$^a$, the lower edge of which is slightly contracted or clinched under the rim flange of the retaining ring 11, so that the three metallic elements are rigidly connected. The flange 12$^a$, however, projects below the rim flange of the retaining ring 11, so that there is formed within the same an annular seat that will receive and frictionally hold a gasket or packing ring 17 of some suitable pliable material that will not be damaged by gasoline. Cork might be employed for the gasket 17, but certain composition gaskets, such as may be purchased on the market, will better serve the purpose.

The clamping rim 12 is also preferably provided with downturned interior flanges 12$^b$ that follow the inner edge of the ring and the sides of the cross bar 15.

The retaining ring just described is preferably made by first stamping out a flat blank of the form shown in Fig. 4, wherein the body of the blank is indicated by the character 12′, and the spring-prong-forming portions are indicated by the numeral 14′.

By reference particularly to Figs. 2 and 3, it will be noted that the spring prongs 14, in vertical section, are built on the lines of ogee curves, so that they clear the internal threads of the filler neck 9, except the lowermost threads, and these lowermost threads are engaged by upwardly converging portions of said spring prongs. Otherwise stated, the outwardly bulged lower portions of the spring prongs, when the cap is applied, spring radially outward of the threads of the filler neck and expand to a greater diameter than the interior of the threads. From this, it follows that in applying the cap to the threaded interior of the filler neck, the group of spring prongs will be contracted, and when the cap is seated with the gasket 16 on the top of the filler neck, the group of spring prongs will expand and securely hold the cap against accidental displacement, for, of course, removal of the cap can be accomplished only by an upward pull, such as will contract the group of spring prongs. Of course, this cap can be applied to a threadless filler neck, but the threads increase the frictional contact between the filler neck and cap and assist in preventing accidental displacement of the cap. This cap, therefore, is especially well adapted for application to filler necks having internal threads and from which the customary externally threaded filler caps have been removed.

The threaded filler caps, such as hitherto generally employed, cannot be quickly applied or quickly removed, and, moreover jarring of the machine is liable to loosen the same. This improved cap can be removed by a simple upward movement and can be applied by a simple downward movement, and actual practice has shown that they will not, under any circumstances, be accidentally displaced. With the air passage 13 at the bottom of the bowl, there is little possibility of any gasoline being splashed into the bowl, but if a little gasoline should, under very rough usage of the car, be splashed into the bowl, it will be quickly drained back into the tank. Preferably, the several metallic parts of the improved filler cap are stamped from rolled sheet steel, but they may be stamped from any suitable sheet metal.

What I claim is:

1. A closure cap comprising a bowl, a retaining ring, and a clamping rim formed from stamped sheet metal, said rim having a flange holding the said three elements together, said retaining ring having circumferentially spaced depending spring prongs adapted to project through and engage a filler neck or the like.

2. The structure defined in claim 1 in which said bowl is provided with an air passage in its bottom.

3. The structure defined in claim 1 in which said clamping rim has a diametrically extended bar affording a finger piece by means of which it may be handled.

4. The structure defined in claim 1 in which said clamping rim has a diametrically extending bar affording a finger piece by which it may be handled, and in which said bowl and bar are provided with axially aligned perforations.

5. The structure defined in claim 1 in which the circumferentially spaced clamping prongs of said retaining ring in vertical section have the lines of ogee curves with the lower portions of said prongs converging inwardly toward the axis of the cap.

6. The structure defined in claim 1 in which said clamping rim is provided with an inwardly contracted marginal flange that overlaps the marginal flanges of said bowl and retaining ring and projects below the latter to afford a gasket-receiving channel, and a gasket applied in said channel.

7. The structure defined in claim 1 in further combination with a gasket applied around the prongs of said retaining ring and seated against the marginal flange of the latter.

8. The structure defined in claim 1 in which said clamping rim has a diametrically extended bar affording a finger piece by means of which it may be handled, said clamping rim having a marginal flange clinched against the marginal flanges of said bowl and retaining ring to hold the said three elements together, said rim further having depressed inner flanges that follow the inner surface thereof and the edge surfaces of said diametrical bar.

In testimony whereof I affix my signature.

MARTIN H. BREDE.